(12) United States Patent
Yoo et al.

(10) Patent No.: US 7,058,420 B2
(45) Date of Patent: Jun. 6, 2006

(54) POWER AUTOMATION SYSTEM USING TRUNKED RADIO SYSTEM NETWORK AND CONTROL METHOD THEREOF

(75) Inventors: Dong Hee Yoo, Seoul (KR); Kang Sik Jung, Seoul (KR)

(73) Assignee: Korea Electric Power Corporation, Seoul (KR)

( * ) Notice: Subject to any disclaimer, the term of this patent is extended or adjusted under 35 U.S.C. 154(b) by 489 days.

(21) Appl. No.: 10/369,707

(22) Filed: Feb. 21, 2003

(65) Prior Publication Data

US 2003/0162538 A1    Aug. 28, 2003

(30) Foreign Application Priority Data

Feb. 22, 2002  (KR) ...................... 10-2002-0009605
Feb. 22, 2002  (KR) ...................... 10-2002-0009606
Feb. 22, 2002  (KR) ...................... 10-2002-0009607

(51) Int. Cl.
    *H04B 7/00*    (2006.01)
(52) U.S. Cl. ................ 455/520; 455/553.1; 455/556.1; 370/395.53
(58) Field of Classification Search ................ 455/556, 455/445, 426, 420, 520, 556.1, 423, 424, 455/553.1; 340/870.02, 310; 364/492; 709/208; 370/395.53
See application file for complete search history.

(56) References Cited

U.S. PATENT DOCUMENTS

| | | | |
|---|---|---|---|
| 5,010,544 A * | 4/1991 | Chang et al. ................ 370/243 |
| 5,179,376 A * | 1/1993 | Pomatto ................ 340/870.02 |
| 5,406,495 A * | 4/1995 | Hill ............................. 702/72 |
| 5,689,801 A * | 11/1997 | Frichtel et al. ................ 455/9 |
| 5,694,329 A * | 12/1997 | Pomatto ..................... 700/286 |
| 6,418,324 B1 * | 7/2002 | Doviak et al. ........... 455/426.1 |
| 2002/0091784 A1 * | 7/2002 | Baker et al. ................ 709/208 |
| 2002/0142767 A1 * | 10/2002 | Mears et al. ................ 455/426 |

\* cited by examiner

*Primary Examiner*—Tilahun Gesesse
*Assistant Examiner*—Tan Trinh
(74) *Attorney, Agent, or Firm*—Dykema Gossett PLLC

(57) ABSTRACT

Disclosed are a power automation system using a TRS network and a control method thereof which can reduce the power failure time and power failure areas when an obstacle is raised by providing a pure radio transmission path using a TRS network, in which base transceiver subsystems mostly stand on an eminence and a high output service can be provided, between a control center computer and power equipment so that the remote control center computer can promptly control the power equipment and the obstacle raised in the power equipment. The power automation system using the TRS network includes a power automation control center computer for performing a remote control and measurement of a remote terminal unit (RTU), a radio communication unit, connected to the control center computer, for outputting a radio communication signal to the outside, a TRS base transceiver subsystem for repeating a radio signal so that it can receive and transmit the radio signal outputted from the radio communication unit using the TRS network, and a power equipment connected by wireless to the TRS base transceiver subsystem.

4 Claims, 5 Drawing Sheets

POWER AUTOMATION SYSTEM USING TRUNKED RADIO SYSTEM NETWORK AND CONTROL METHOD THEREOF

BACKGROUND OF THE INVENTION

1. Field of the Invention

The present invention relates to a power automation system using a trunked radio system (TRS) network and a control method thereof, and more particularly, to a power automation system using a TRS network and a control method thereof which can reduce the power failure time and power failure areas when an obstacle is raised by providing a pure radio transmission path using a TRS network, in which base transceiver subsystems mostly stand on an eminence and a high output service can be provided, between a control center computer and power equipment so that the remote control center computer can promptly control the power equipment and the obstacle raised in the power equipment.

2. Background of the Related Art

Recently, in order to stably and economically provide the power, techniques of power-feed automation, power-distribution automation, power-transmission/transform automation, etc., have been developed.

FIG. 1 is a view illustrating the construction of a conventional power automation system. As shown in FIG. 1, the conventional power automation system includes a control center computer 1 capable of remotely controlling and measuring the power equipment is connected to a wire communication unit 2. The wire communication unit 2 is connected by wire to a wire communication network 3 such as an exchange, terminal equipment, etc. The wire communication network 3 is connected to a radio base transceiver subsystem 4 through a private line, and to power equipment 5 by wire.

The wire communication network 3 and the power equipment 5 are connected by a wire data communication provider through a pair cable or an optical cable that is a wire line, and the radio base transceiver subsystem 4 and the power equipment 5 are connected by wire by a radio data communication provider.

The conventional power automation system as constructed above has the operation characteristics in that the control center computer 1 connects to the radio base transceiver subsystem 4 and the power equipment 5 using the wire communication network 3 through the wire communication unit 2, and monitors and controls the state of the power equipment 5.

However, according to the conventional power automation system as described above, a transmission path between the control center computer 1 and the power equipment 5 such as a remote terminal unit (RTU) depends on the wire line (i.e., the pair cable or optical cable) provided by the wire data communication entrepreneur, and the private radio data network provided by the radio data communication entrepreneur inevitably passes through the wire network (i.e., private line) connected to the control center computer, exchange, and radio base transceiver subsystem. Accordingly, a stable application of power automation is obstructed due to frequent disconnections of the transmission line since it takes a long time to find obstacles when such obstacles occur due to the crosstalk and disconnections of the communication cable and due to the exchange and the communication terminal equipment.

In addition, almost wire communication cables are installed in an underground cable tunnel in consideration of the appearance of the downtown area. Therefore, when the cable tunnel is on a fire, a large amount of service through wire communication lines for power automation may be inevitably stopped for a long time.

Also, if an aerial communication cable is installed using a ground electric power distribution pole, it is difficult to form the wire lines because a communication pole is frequently relocated and breaking switches to be controlled are scattered. Lines are broken and a large amount of crosstalk occurs due to a typhoon and a heavy rain in summer and a heavy snow in winter. This causes the aerial wire communication cable not to be used when it is necessary.

SUMMARY OF THE INVENTION

Accordingly, the present invention is directed to a power automation system using a trunked radio system (TRS) network and a control method thereof that substantially obviate one or more problems due to limitations and disadvantages of the related art.

It is an object of the present invention to provide to a power automation system using a TRS network and a control method thereof which can provide a stable power automation line irrespective of obstacles of a wire communication line by a pure radio system using a TRS network, in which base transceiver subsystems mostly stand on an eminence and a high output service can be provided, between a control center computer and a power equipment so that the remote control center computer can promptly control the power equipment and the obstacle raised in the power equipment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In order to achieve the above object, there is provided a power automation system using a trunked radio system (TRS) network, including a power automation control center computer for performing a remote control and measurement of a remote terminal unit (RTU), a radio communication unit, connected to the control center computer, for outputting a radio communication signal to the outside, a TRS base transceiver subsystem for repeating a radio signal so that it can receive and transmit the radio signal outputted from the radio communication unit using the TRS network, and a power equipment connected by wireless to the TRS base transceiver subsystem.

The power automation system may further includes a gateway for converting a power automation protocol outputted from the control center computer into a radio protocol that can be received by the TRS base transceiver subsystem, and a controller, connected to the gateway, for automatically resetting a power of the radio communication unit if there is no response to an interface signal from the radio communication unit for a specified time.

The radio communication unit has a construction in which a plurality of TRS modems are connected in parallel in order to transmit and receive data by wireless using the TRS base transceiver subsystem and a plurality of channels.

The power equipment includes a radio modem, connected to a switch located far apart from the TRS base transceiver subsystem, for transmitting and receiving data by wireless, a protocol controller, i.e., a packet assemble disassemble (PDA) for converting a radio protocol of the radio modem into a distributed network protocol and assembling/disassembling packet data, a remote terminal unit (RTU) for controlling and monitoring the power equipment, measuring an amount of power, and transmitting corresponding signals, and a switch for opening and closing the line of the power equipment.

In another aspect of the present invention, there is provided a power automation system using a trunked radio system (TRS) network, including a plurality of power automation control center computers for performing a remote control and measurement of remote terminal units (RTUs), a plurality of gateways for converting a distributed network protocol outputted from the control center computers into a radio protocol that can be received by TRS base transceiver subsystems, a first local area network (LAN) for connecting the gateways through networking, a radio data switching unit for distributing calls coming from the base transceiver subsystems to the respective RTUs and the gateways, respectively, a second LAN for connecting a plurality of radio communication units through networking, the plurality of radio communication units, connected to the radio data switching unit through the second LAN, for outputting radio communication signals to the outside, a plurality of TRS base transceiver subsystems for repeating radio signals so that they can receive and transmit the radio signals outputted from the radio communication units, and a power equipment connected by wireless to the TRS base transceiver subsystems.

In still another aspect of the present invention, there is provided a method of controlling a power automation system using a trunked radio system (TRS) network, including the steps of a power automation control center computer sensing a power failure state of a remote terminal unit (RTU) of a power equipment, the control center computer providing a control command to the power equipment of which the power failure is sensed, the control center computer transmitting distributed network protocol (DNP) data to a gateway, converting the DNP transmitted to the gateway into a TRS protocol, transmitting the TRS protocol data to a power equipment radio modem by transmitting the TRS protocol data to a TRS base transceiver subsystem using a radio communication unit, converting the TRS protocol transmitted to the radio modem into a DNP using a protocol converter, transmitting the converted DNP data to the RTU, and controlling a switch by analyzing the control command of the control center computer transmitted to the RTU.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

The power automation system using a TRS network and a control method thereof according to the preferred embodiments of the present invention will now be explained in detail with reference to the accompanying drawings.

Figure 1:
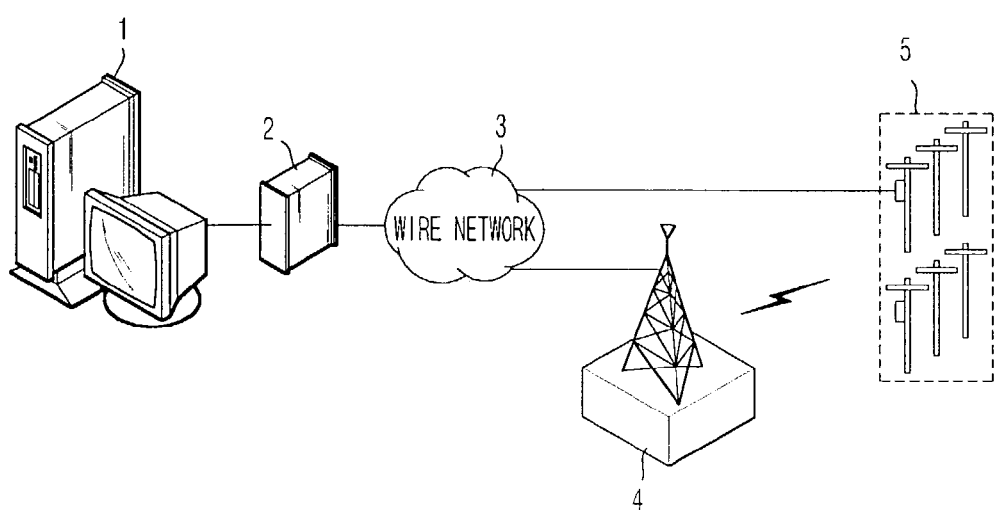
FIG. 1 is a view illustrating the construction of a conventional power automation system.
Figure 2:
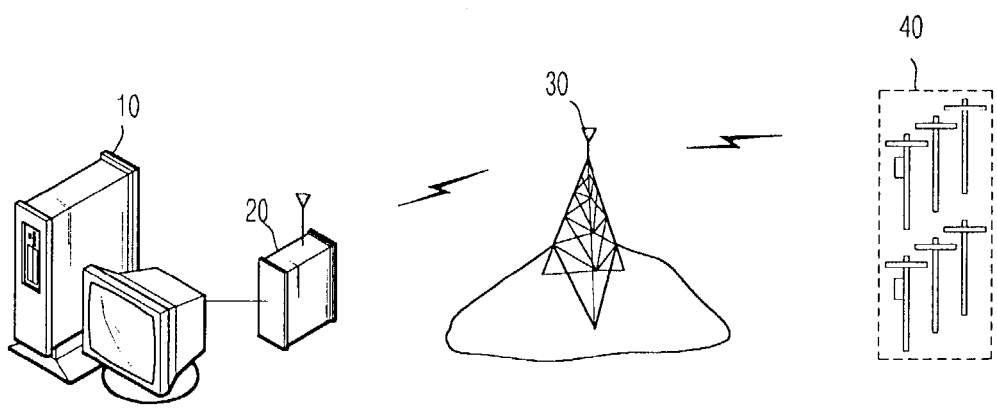
FIG. 2 is a block diagram of a power automation system using a TRS network according to an embodiment of the present invention.

FIG. 2 is a block diagram of the power automation system using a TRS network according to an embodiment of the present invention.

Referring to FIG. 2, the power automation system using the TRS network according to an embodiment of the present invention includes a power automation control center computer 10 for performing a remote control and measurement of a remote terminal unit (RTU), a radio communication unit 20, connected to the control center computer 10, for outputting a radio communication signal to the outside, a TRS base transceiver subsystem 30 for repeating a radio signal so that it can receive and transmit the radio signal outputted from the radio communication unit 20 using the TRS network, and power equipment 40 connected by wireless to the TRS base transceiver subsystem 30.

The power automation system using the TRS network according to an embodiment of the present invention can provide a stable power automation line irrespective of obstacles of a wire communication line by a pure radio system using the TRS network, in which the base transceiver subsystem 30 stands on an eminence and provides a high output service, between the control center computer 10 and the power equipment 40 so that the remote control center computer 10 can promptly control the power equipment 40 and the obstacle raised in the power equipment 40.

Figure 3:
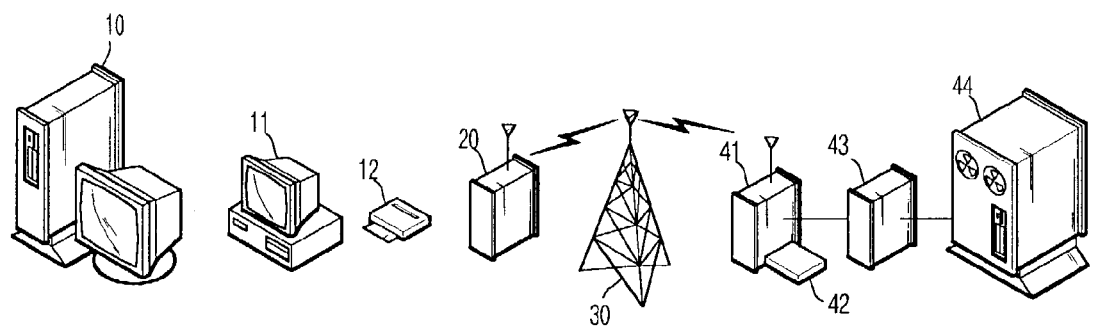
FIG. 3 is a view illustrating the detailed construction of a power automation system using a TRS network for a single base transceiver subsystem according to another embodiment of the present invention.

FIG. 3 is a view illustrating the detailed construction of the power automation system using the TRS network for a single base transceiver subsystem according to another embodiment of the present invention.

Referring to FIG. 3, the power automation system using the TRS network for a single base transceiver subsystem according to another embodiment of the present invention includes a power automation control center computer 10 for performing a remote control and measurement of a remote terminal unit (RTU) 43, a radio communication unit 20, connected to the control center computer 10, for outputting a radio communication signal to the outside, a TRS base transceiver subsystem 30 for repeating a radio signal so that it can receive and transmit the radio signal outputted from the radio communication unit 20, power equipment 40 connected by wireless to the TRS base transceiver subsystem 30, a gateway 11 for converting a power automation protocol outputted from the control center computer 10 into a radio protocol that can be received by the TRS base transceiver subsystem 30, and a controller 12, connected to the gateway 11, for automatically resetting the power of the radio communication unit 20 if there is no response to an interface signal from the radio communication unit 20 for a specified time.

The power equipment 40 includes a radio modem 41, connected to a switch 44 located far apart from the TRS base transceiver subsystem 30, for transmitting and receiving data by wireless, a packet assemble disassemble (PDA) 42 for converting a radio protocol of the radio modem 41 into a distributed network protocol and assembling/disassembling packet data, the remote terminal unit (RTU) 43 for controlling and monitoring the power equipment 40, measuring an amount of power, and transmitting corresponding signals, and the switch 44 for opening and closing the line of the power equipment.

Figure 4:
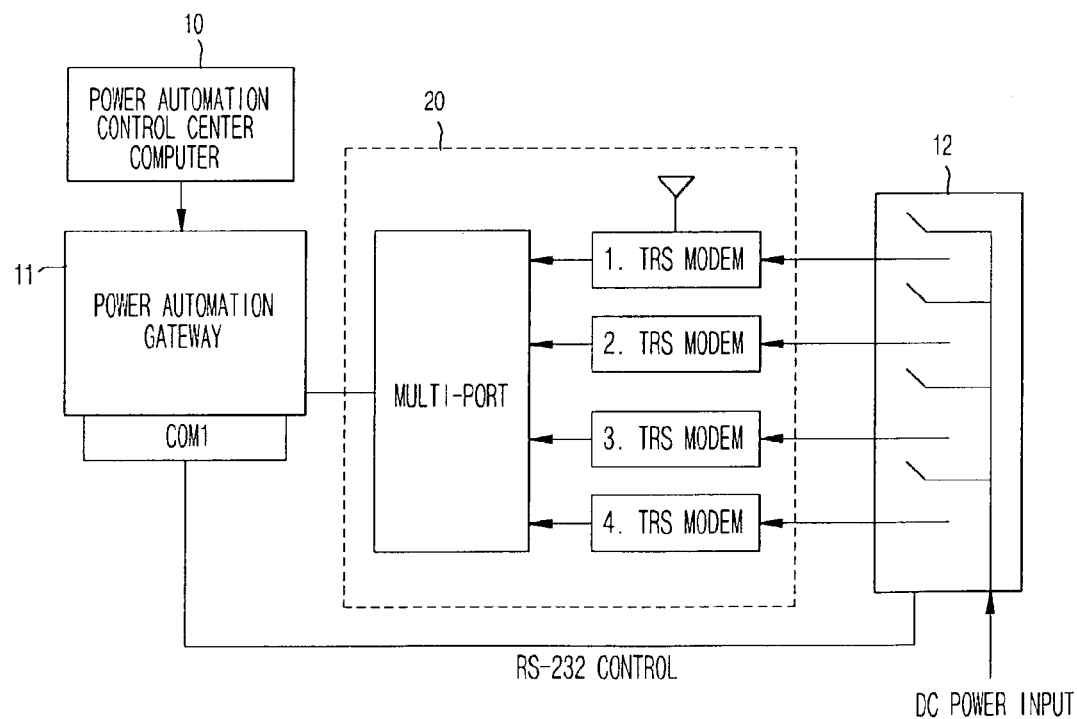
FIG. 4 is a view illustrating the detailed construction of a radio communication unit of a power automation system using a TRS network for a single base transceiver subsystem according to another embodiment of the present invention.

FIG. 4 is a view illustrating the detailed construction of the radio communication unit of the power automation system using the TRS network for a single base transceiver subsystem according to another embodiment of the present invention.

Referring to FIG. 4, the radio communication unit 20 of the power automation system using the TRS network for a single base transceiver subsystem according to another embodiment of the present invention has a construction in which a plurality of TRS modems are connected in parallel.

Figure 5A:
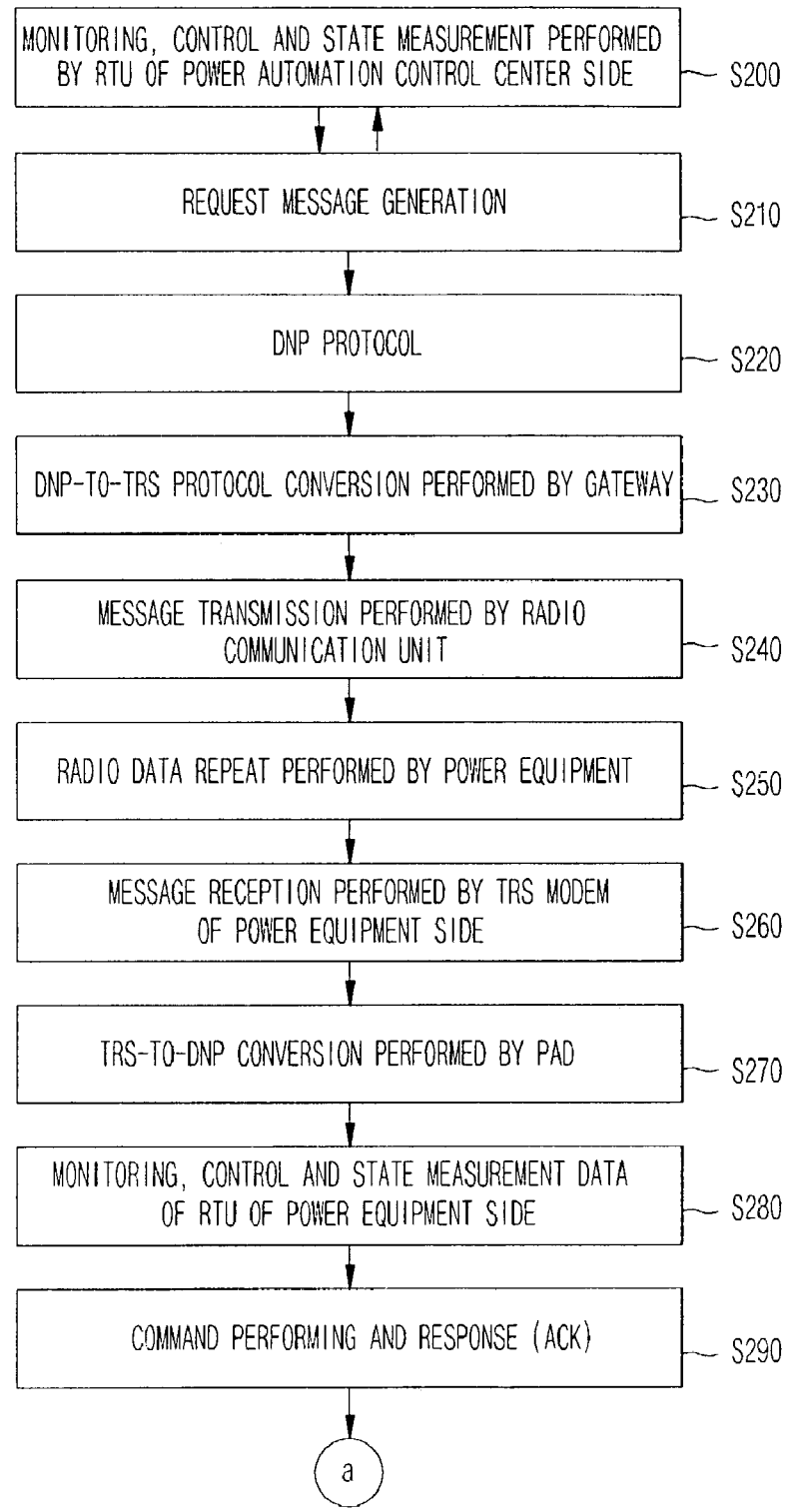
FIGS. 5A and 5B illustrate a flowchart illustrating a method of controlling a power automation system using a TRS network for a single base transceiver subsystem according to another embodiment of the present invention.
Figure 5B:
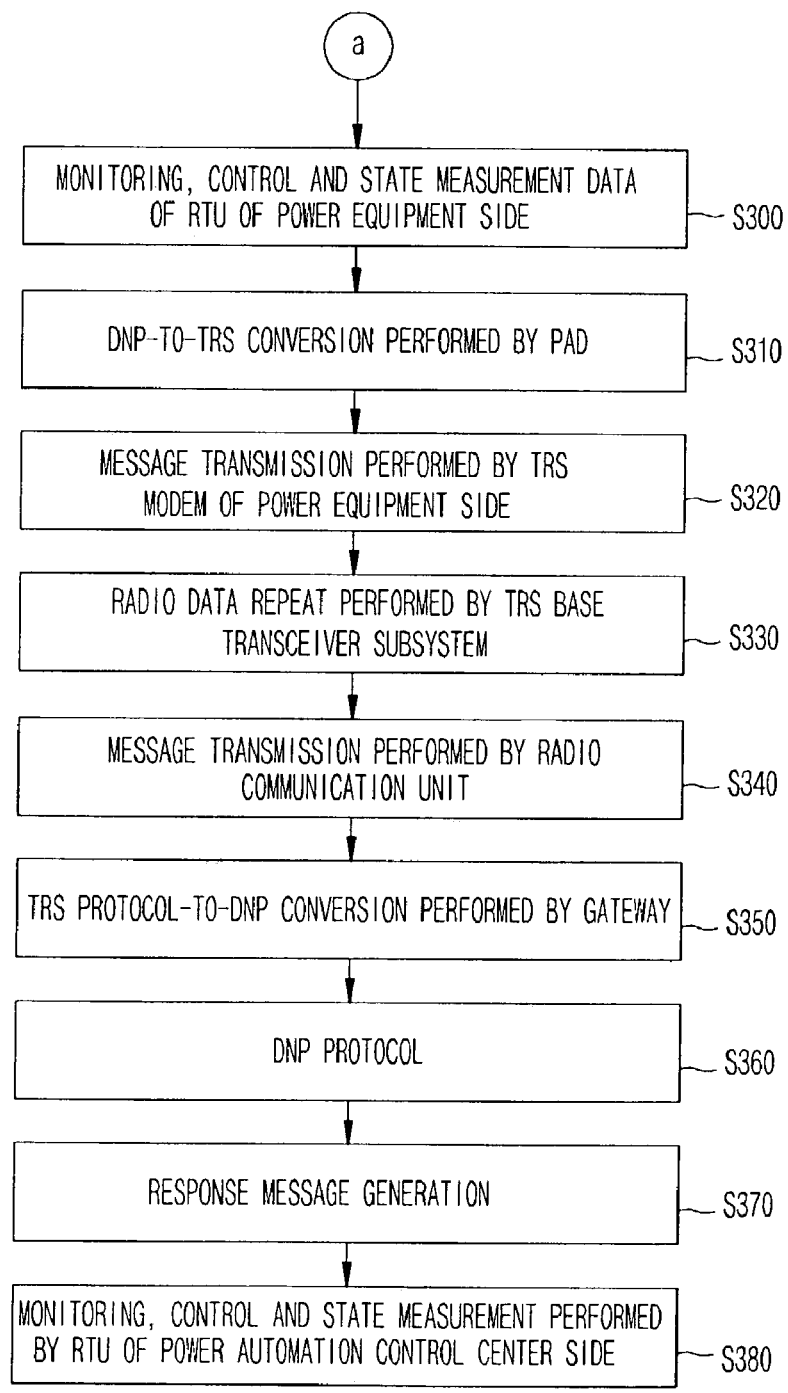

The operation of the power automation system using the TRS network for a single base transceiver subsystem according to another embodiment of the present invention will now be explained with reference to FIGS. 5A and 5B.

If the control center computer 10 starts the monitoring, control and state measurement of the power equipment 40 (step S200), it generates a message for requesting information on the current state of the power equipment (step S210).

The request message generated from the control center computer 10 is transmitted to the gateway 11 as distributed network protocol (DNP) data (step S220), converted Into a data frame that matches the TRS radio protocol by the gateway 11 (step S230), and then transmitted from the radio communication unit 20 to the TRS base transceiver subsystem 30 (step S240).

The TRS base transceiver subsystem 30 repeats the radio data frame to the radio modem 41 (step S250), and the radio modem 41 receives and outputs the radio data frame to the protocol converter 42 (step S260). The protocol converter 42 extracts only the DNP data and transmits the extracted DNP data to the RTU 43 (step S270).

The RTU 43 analyzes the request message (step S280), performs a command for checking the state of the power equipment according to the request message, and responds to the request message (step S290).

If it is checked that a power failure occurs due to a ground fault, short circuit, disconnection of power lines, etc., in the power equipment 40 as a result of checking the state of the power equipment 40 such as a power transmission line, power distribution line, circuit breaker, etc., the RTU 43 generates data in an unsolicited manner (step S300). The protocol converter 42 converts the generated data into the TRS radio protocol by analyzing the data so as to enable the packet transmission to the radio network, and transmits the converted TRS radio protocol to the radio modem 41 (step S310). The radio modem 41 transmits the TRS radio protocol to the TRS base transceiver subsystem 30 with an ID of the pre-inputted radio communication unit 20 of the control center side (step S320).

The TRS base transceiver subsystem 30 receives the radio data call of the radio modem 41 of the power equipment side, and repeats by wireless the data to the radio communication unit 20 of the control center side (step S330).

If the IDs are coincident with each other, the radio communication unit 20 of the control center side, to which a radio call is connected, transmits the received data to the gateway 11 (step S340). The gateway 11 transmits the data of only the DPN for the pure power automation to the power automation control center computer 10 through a conversion step (step S350) of taking off a header of the TRS radio protocol (step S360).

The control center computer 10 generates a response message by receiving the DNP (step S370), judges if the power failure occurs due to the ground fault, short circuit, disconnection of power lines, etc., in the power equipment 40 such as the power transmission line, power distribution line, circuit breaker, etc., by analyzing the response message, and performs the corresponding control (step S380).

If the power failure occurs due to the ground fault, short circuit, disconnection of power lines, etc., in the power equipment 40 such as the power transmission line, power distribution line, circuit breaker, etc., the control center computer 10 selects the corresponding power equipment 40 and outputs a control command to close or open the circuit breaker or the switch in order to promptly supply the power to the power failure area.

The control command generated from the control center computer 10 is transmitted to the gateway 11 as the DNP data, and the gateway 11 converts the control command into a data frame that matches the TRS radio protocol and then transmits the data frame to the corresponding power equipment 40 through the radio communication unit 20 and the TRS base transceiver subsystem 30.

The radio modem 41 of the corresponding power equipment 40 receives and outputs the radio data frame to the protocol converter 42. The protocol converter 42 extracts only the DNP data frame, and transmits the extracted DNP data to the RTU 43.

The RTU 43 analyzes the control command, and opens or closes the switch 44.

Figure 6:
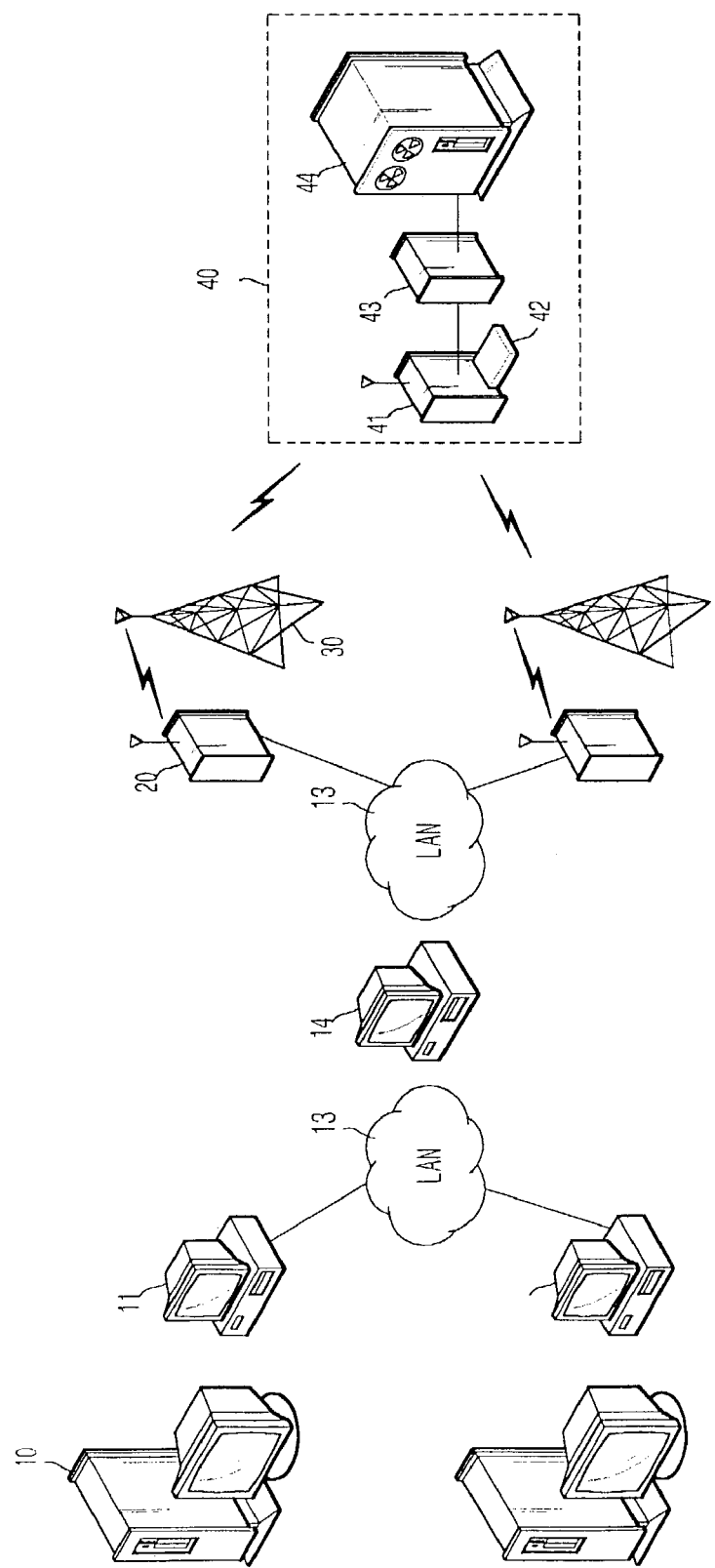
FIG. 6 is a view illustrating the detailed construction of a power automation system using a TRS network for multiple base transceiver subsystems according to still another embodiment of the present invention.

FIG. 6 is a view illustrating the detailed construction of the power automation system using the TRS network for multiple base transceiver subsystems according to still another embodiment of the present invention.

Referring to FIG. 6, the power automation system using the TRS network for multiple base transceiver subsystems according to still another embodiment of the present invention includes a plurality of power automation control center computers 10 for performing a remote control and measurement of remote terminal units (RTUs) 43, a plurality of gateways 11 for converting a distributed network protocol (DNP) outputted from the control center computers 10 into a radio protocol that can be received by TRS base transceiver subsystems 30, a first local area network (LAN) 13 for connecting the gateways 11 through networking, a radio data switching unit 14 for distributing calls coming from the base transceiver subsystems to the respective RTUs 43 and the gateways 11, respectively, a second LAN 15 for connecting a plurality of radio communication units through networking, the plurality of radio communication units 20, connected to the radio data switching unit 14 through the second LAN 15, for outputting radio communication signals to the outside, a plurality of TRS base transceiver subsystems 30 for repeating radio signals so that they can receive and transmit the radio signals outputted from the radio communication units 20, and power equipment 40 connected by wireless to the TRS base transceiver subsystems 30.

According to the power automation system using the TRS network for multiple base transceiver subsystems, the procedure of obtaining the state information on the trouble occurrence from the power equipment and the procedure of controlling the power equipment performed by the control center computer 10 are identical to those of the power automation system using the single base transceiver subsystem, but it is different to use the radio data switching unit in order to distribute the calls coming from the respective base transceiver subsystems to the respective RTUs 43 and the gateways 11.

In applying the multiple base transceiver subsystems according to the present invention, the coverage of the single base transceiver subsystem of the TRS network is wide enough to accommodate a plurality of RTUs 43. However, in case that the area that is within the province of the control center computer 10 escapes from the extent of jurisdiction of the single base transceiver subsystem, another base transceiver subsystem should inevitably be used.

In the power automation system using the TRS network for multiple base transceiver subsystems, the LANs 13 and 15, which are wire networks, should inevitably be used among the gateways 11, radio data switching unit 14 and the radio communication units 20. However, since the base transceiver subsystems mostly stand on an eminence and emit a high output, the communication path is simplified in comparison to the conventional private lowland small-output radio data network, and the wired section can be greatly reduced to provide the stable characteristics.

As described above, according to the power automation system using the TRS network and the control method thereof, a stable power automation line can be provided irrespective of obstacles of the wire communication line by the pure radio system using the TRS network, in which base transceiver subsystems mostly stand on an eminence and a high output service can be provided, between the control center computer and the power equipment so that the remote control center computer can promptly control the power equipment and the obstacle raised in the power equipment.

While the power automation system using the TRS network and the control method thereof according to the present invention have been described and illustrated herein with reference to the preferred embodiments thereof, it will be understood by those skilled in the art that various changes and modifications may be made to the invention without departing from the spirit and scope of the invention, which is defined in the appended claims.

What is claimed is:

1. A power automation system using a trunked radio system (TRS) network, comprising:
    a plurality of power automation control center computers for performing a remote control and measurement of remote terminal units (RTUs);
    a plurality of gateways for converting a distributed network protocol outputted from the control center computers into a radio protocol that can be received by TRS base transceiver subsystems;
    a first local area network (LAN) for connecting the gateways through networking;
    a radio data switching unit for distributing calls coming from the base transceiver subsystems to the respective RTUs and the gateways, respectively;
    a second LAN for connecting a plurality of radio communication units through networking;
    the plurality of radio communication units, connected to the radio data switching unit through the second LAN, for computing radio communication signals to the outside;
    a plurality of TRS base transceiver subsystems for repeating radio signals so that they can receive and transmit the radio signals outputted from the radio communication units; and
    a power equipment connected by wireless to the TRS base transceiver subsystems.

2. The power automation system as claimed in claim 1, wherein the radio communication unit has a construction in which a plurality of TRS modems are connected in parallel in order to transmit and receive data by wireless using the TRS base transceiver subsystem and a plurality of channels.

3. A power automation system as claimed in claim 1, wherein the power equipment includes:
    a radio modem, connected to a switch located far apart from the TRS base transceiver subsystem, for transmitting and receiving data by wireless;
    a protocol converter for converting a radio protocol of the radio modem into a distributed network protocol and assembling/disassembling packet data;
    a remote terminal unit (RTU) for controlling and monitoring the power equipment, measuring an amount of power, and transmitting corresponding signals; and
    a switch for opening and closing a line of the power equipment.

4. A method of controlling a power automation system using a trunked radio system (TRS) network, comprising the steps of:
    a power automation control center computer sensing a power failure state of a remote terminal unit (RTU) of a power equipment;
    the control center computer providing a control command to the power equipment of which the power failure is sensed;
    the control center computer transmitting distributed network protocol (DNP) data to a gateway;
    converting the DNP transmitted to the gateway into a TRS protocol;
    transmitting the TRS protocol data to a power equipment radio modem by transmitting the TRS protocol data to a TRS base transceiver subsystem using a radio communication unit;
    converting the TRS protocol transmitted to the radio modem into a DNP using a protocol converter;
    transmitting the converted DNP data to the RTU; and
    controlling a switch by analyzing the control demand of the control center computer transmitted to the RTU.

* * * * *